United States Patent Office 3,785,911
Patented Jan. 15, 1974

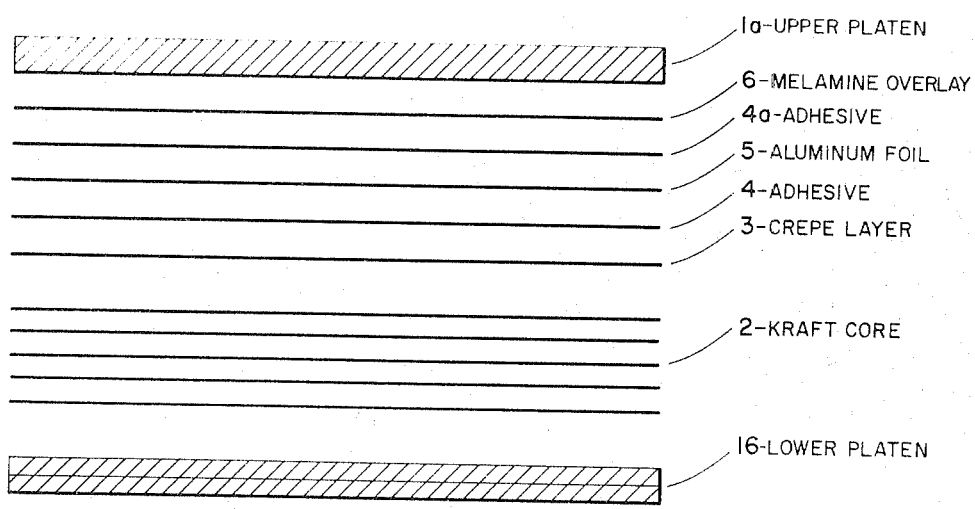

3,785,911
METALLIC APPEARING LAMINATE
Israel S. Ungar and Herbert I. Scher, Randallstown, Md., assignors to Esso Research and Engineering Company
Continuation of abandoned application Ser. No. 834,610, June 13, 1969. This application June 29, 1971, Ser. No. 157,914
Int. Cl. B44f 7/00
U.S. Cl. 161—5                    4 Claims

ABSTRACT OF THE DISCLOSURE

A decorative hammered metal appearing laminate produced by interlaminating an aluminum sheet between a melamine layer and crepe mounted on kraft core at high pressures and temperatures. Such laminates find particular use in furniture, commercial case goods and architectural specifications.

---

This application is a continuation of application Ser. No. 834,610, filed June 13, 1969, now abandoned.

BACKGROUND OF THE INVENTION

Field of the invention

This invention relates to a process for producing metallic appearing laminate by the interlamination of an aluminum sheet. More particularly this invention relates to producing a metallic appearing melamine surfaced, high pressure decorative laminate having a hammered metal appearance.

Description of the prior art

For years the industry has attempted to obtain a hammered metal appearing laminate which can be easily and simply produced in a one-step process. In U.S. Pat. No. 3,180,779 to Conger et al. there is described an elaborate process for producing such metallic appearing laminate by the use of steps involving embossing, laminating and planishing as well as the separate treatment of each of the component parts of the laminate to cause a hammered metal effect. This and other prior art in attempting to add an aluminum sheet under a melamine overlay, however, merely yielded gray non-metallic surfaces, thus defeating the use of metallic sheets.

The purpose of this invention, therefore, is the production of a decorative plastic surface having a three-dimensional hammered metal appearance which is smooth wearing, scintillating and not subject to distortion by pressing.

SUMMARY OF THE INVENTION

Applicants have now found, quite surprisingly that by placing an aluminum foil under a melamine impregnated cellulose overlay which is mounted on a phenolic impregnated crepe and a phenolic impregnated kraft core, a laminate with a hammered metal appearance is obtained. This effect is produced by laminating said layers of material at a temperature of 270°–310° F., and 800–1200 p.s.i. for a period of 50–90 minutes, while compressing between steel plates. The highly interesting metal pattern is formed as a result of the compression flow characteristics of the melamine overlay and the kraft core acting upon the crepe paper upon which is mounted the aluminum foil resulting in the uneven reticulated or hammered metal effect. As is well known, melamine which is originally translucent, becomes transparent when heated under conditions as described above. Thus, in the final product the metal is clearly visible yet protected by a transparent overlay.

This product has important uses in furniture, commercial case goods and architectural specifications.

BRIEF DESCRIPTION OF THE DRAWING

The invention can be better understood from the following detailed description when read in conjunction with the drawing wherein the figure shows a diagrammatic view of the construction of the metallic laminate and its relationship to compressing steel plates employed in the novel process of this invention. Between steel plates 1a (upper) and 16 (lower) there is placed in upward building-block fashion a phenolic resin impregnated kraft core 2 with a phenolic resin impregnated crepe layer 3 placed thereupon. This crepe layer is then coated with an adhesive 4 and the aluminum foil 5 is placed on said adhesive. The aluminum foil is again coated with the same or a similar adhesive which must be transparent 4a and the melamine resin impregnated overlay 6 completes the assembly.

In actual practice the aluminum foil is coated front and back with an adhesive. The coated foil is then interleaved between the overlay and the crepe. When pressed between plates the foil wrinkles while the overlay takes the surface of the upper press plate. This will then produce a laminate which upon compression between steel plates at 800–1200 p.s.i. and a temperature of 270°–310° F. for 50–90 minutes will produce by the dissimilar shrinking characteristic of the laminated layers a hammered metal effect.

Kraft paper is known in the art to be produced from chopped up partially refined wood pulp. Saturating kraft paper is the type used in this invention since it is capable of absorbing resin. For reasons of economy, kraft paper which is produced from unbleached pulp is preferred.

The most preferred kraft core paper employed in this invention is one treated with phenolic resin and has a resin content of 28–32%. Other resins which are also useful are melamine, urea, polyesters, epoxide, diallyl phthalate, etc.

The preferred crepe paper is one obtained from Cincinnati Industries and is impregnated with a phenolic resin having a 30–34% resin content. Other useful resins include melamine, urea, polyesters, epoxides, diallyl phthalate, etc. Paper may also be Clupack or other crimped or wrinkled paper.

For the adhesives in layers 4 and 4a, any transparent adhesive such as Du Pont Surlyn (an olefin-carboxylic acid polymer) acrylic, urea and melamine base resin, polyisocyanates, polyamides, polyimides, polyvinyls, etc., or combinations thereof may be used. For the top layer of adhesive, however, a pigmented adhesive may be employed if such colored effect is desired. Finally, for the overlay the preferred material is 29# alpha cellulose pigmented or colorless, impregnated with a melamine resin content of 65–72%. Other useful materials include resins such as diallyl phthalate, urea, phenolics, etc.

The thickness of each of these layers can be varied to give various effects. However, the thickness of the core ranged from 0.022 to 0.125 mil; the crepe from 10 mils to 25 mils; the aluminum from ½ to 2 mils and the melamine overlay from 0.003 to 0.010.

It will be obvious to those skilled in the art that various changes may be made especially in materials without departing from the scope and spirit of the invention. Therefore, this invention is not limited to what is shown in the drawings and described in the specification, but only as indicated in the appended claims.

What is claimed is:

1. A laminate having a three-dimensional metallic appearance comprising a sheet of aluminum foil adhesively bonded to a resin impregnated crepe paper layer, the opposite side of said paper layer being adhesively bonded to a resin impregnated kraft core, said foil having adhesively bonded thereto, by means of a transparent layer of adhesive, a transparent melamine resin impregnated cellulose overlay sheet.

2. The laminate of claim 1 wherein the transparent adhesive is selected from the group consisting of urea, melamine, polyisocyanates, polyamides, polyimides, polyvinyls and combinations thereof.

3. The laminate of claim 1 wherein the crepe paper and kraft core are impregnated with a resin selected from the group consisting of phenolics, melamines, ureas, polyesters, epoxides and diallyl phthalate.

4. The laminate of claim 2 wherein the polyvinyl adhesive is an olefin-carboxylic acid polymer.

References Cited

UNITED STATES PATENTS

| | | | |
|---|---|---|---|
| 3,215,579 | 11/1965 | Hagen | 156—289 |
| 3,294,622 | 12/1966 | Wank | 161—413 X |
| 3,180,779 | 4/1965 | Conger et al. | 161—6 |
| 2,084,081 | 6/1937 | Faber | 161—6 |
| 3,311,520 | 3/1967 | Michaelson et al. | 161—215 X |
| 3,698,978 | 10/1972 | McQuade | 156—219 |
| 3,700,537 | 10/1972 | Scher | 161—89 |
| 3,674,619 | 7/1972 | Scher et al. | 161—119 |
| 3,701,711 | 10/1972 | Kelly | 161—214 |

FOREIGN PATENTS

| | | | |
|---|---|---|---|
| 440,578 | 1/1936 | Great Britain | 161—264 |

GEORGE F. LESMES, Primary Examiner

W. R. DIXON, JR., Assistant Examiner

U.S. Cl. X.R.

161—6, 128, 129, 138, 184, 186, 190, 213, 214, 215, 216, 220, 229, 232, 259, 263, 270